(12) United States Patent
Sharp

(10) Patent No.: US 8,085,644 B2
(45) Date of Patent: Dec. 27, 2011

(54) ACHROMATIC POLARIZATION DEVICES FOR OPTICAL DISC PICKUP HEADS

(75) Inventor: Gary D. Sharp, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 269 days.

(21) Appl. No.: 11/303,904

(22) Filed: Dec. 16, 2005

(65) Prior Publication Data

US 2006/0146682 A1   Jul. 6, 2006

Related U.S. Application Data

(60) Provisional application No. 60/593,172, filed on Dec. 16, 2004.

(51) Int. Cl.
G11B 7/135     (2006.01)
(52) U.S. Cl. .................................................. 369/112.01
(58) Field of Classification Search ............ 369/112.01, 369/112.13, 112.08, 112.16, 94, 112.19, 369/112.17, 112.24, 124.01, 118, 122, 44.23, 369/112.22; 359/498, 497, 486, 569, 576; 349/61, 74, 80; 428/215
See application file for complete search history.

(56) References Cited

U.S. PATENT DOCUMENTS

| | | | |
|---|---|---|---|
| 5,472,538 A | 12/1995 | Minakuchi et al. | |
| 5,526,338 A * | 6/1996 | Hasman et al. | 369/94 |
| 5,571,567 A | 11/1996 | Shah | |
| 5,751,384 A | 5/1998 | Sharp | |
| 5,751,385 A * | 5/1998 | Heinze | 349/61 |
| 5,822,293 A * | 10/1998 | Lee et al. | 369/44.23 |
| 5,888,603 A | 3/1999 | Fergason | |
| 5,965,247 A | 10/1999 | Jonza et al. | |
| 5,990,996 A | 11/1999 | Sharp | |
| 6,004,417 A | 12/1999 | Roesch et al. | |
| 6,096,375 A | 8/2000 | Ouderkirk et al. | |
| 6,147,782 A * | 11/2000 | Daiber et al. | 369/124.01 |
| 6,156,433 A | 12/2000 | Hatori et al. | |
| 6,240,053 B1 | 5/2001 | Akiyama | |

(Continued)

FOREIGN PATENT DOCUMENTS

EP    0916989 A    5/1999

(Continued)

OTHER PUBLICATIONS

International search report and written opinion of the international searching authority in corresponding PCT application No. PCT/US05/45423 mailed Sep. 16, 2008.

(Continued)

*Primary Examiner* — Will J Klimowicz
*Assistant Examiner* — Emily Frank
(74) *Attorney, Agent, or Firm* — Baker & McKenzie LLP

(57) ABSTRACT

Chemically-bonded laminated polymer achromatic polarization devices, such as circular polarizers, are disclosed for use in optical disc (e.g., CD/DVD) pickup heads. Chemically-bonded laminated polymer achromatic polarization devices have the benefit of providing stable retardation and optic axis over an extended wavelength range, thereby ensuring orthogonal polarization in double-pass for two or more laser wavelengths. Moreover, the chemically-bonded laminated polymer achromatic polarization devices can be symmetric in construction, such that there is no specific input and output side. This alleviates the need to produce geometries that prohibit inversion of the part when installed in the system. Manufacturing processes that produce chemically-bonded laminated polymer achromatic polarization devices, with high light efficiency, durability and robust performance in a variety of environmental conditions are disclosed.

35 Claims, 8 Drawing Sheets

U.S. PATENT DOCUMENTS

| | | | |
|---|---|---|---|
| 6,565,976 B1 | 5/2003 | Qureshi et al. | |
| 6,580,674 B1 * | 6/2003 | Nishiyama et al. | 369/112.01 |
| 6,638,583 B1 | 10/2003 | Sharp et al. | |
| 6,737,154 B2 * | 5/2004 | Jonza et al. | 428/215 |
| 6,947,215 B2 * | 9/2005 | Hoshi | 359/576 |
| 7,196,847 B2 * | 3/2007 | Ye | 359/501 |
| 7,203,001 B2 * | 4/2007 | Deng et al. | 359/486 |
| 7,352,678 B2 * | 4/2008 | Ooto | 369/112.22 |
| 2003/0123371 A1* | 7/2003 | Nishiyama et al. | 369/112.17 |
| 2003/0174631 A1* | 9/2003 | Nishiyama et al. | 369/112.06 |
| 2004/0004688 A1 | 1/2004 | Kawata et al. | |
| 2004/0032677 A1 | 2/2004 | Su Yu et al. | |
| 2004/0041968 A1 | 3/2004 | Otoshi et al. | |
| 2006/0209643 A1* | 9/2006 | Schleipen | 369/44.23 |

FOREIGN PATENT DOCUMENTS

| | | |
|---|---|---|
| EP | 1126291 A | 8/2001 |
| JP | 2004-145071 | 5/2004 |
| JP | 2004-296041 | 10/2004 |
| WO | WO 98/04651 A1 | 2/1998 |
| WO | WO 00/07172 | 2/2000 |

OTHER PUBLICATIONS

International Preliminary Report on Patentability for PCT/US2005/045423 mailed Mar. 19, 2009.

Supplementary European Search Report for EP 05854192.1 mailed Sep. 21, 2009.

* cited by examiner

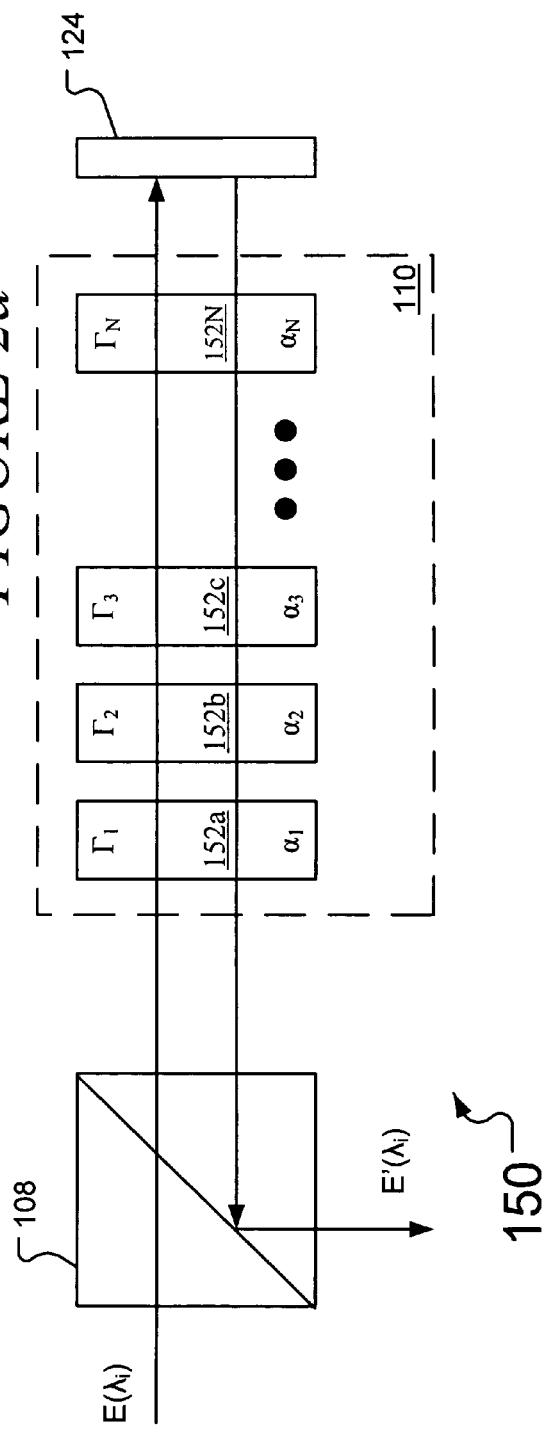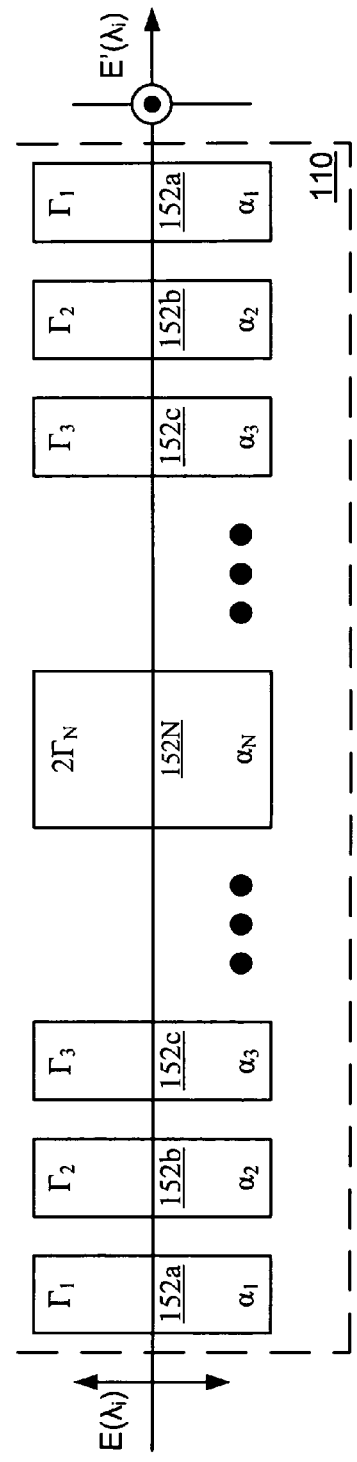

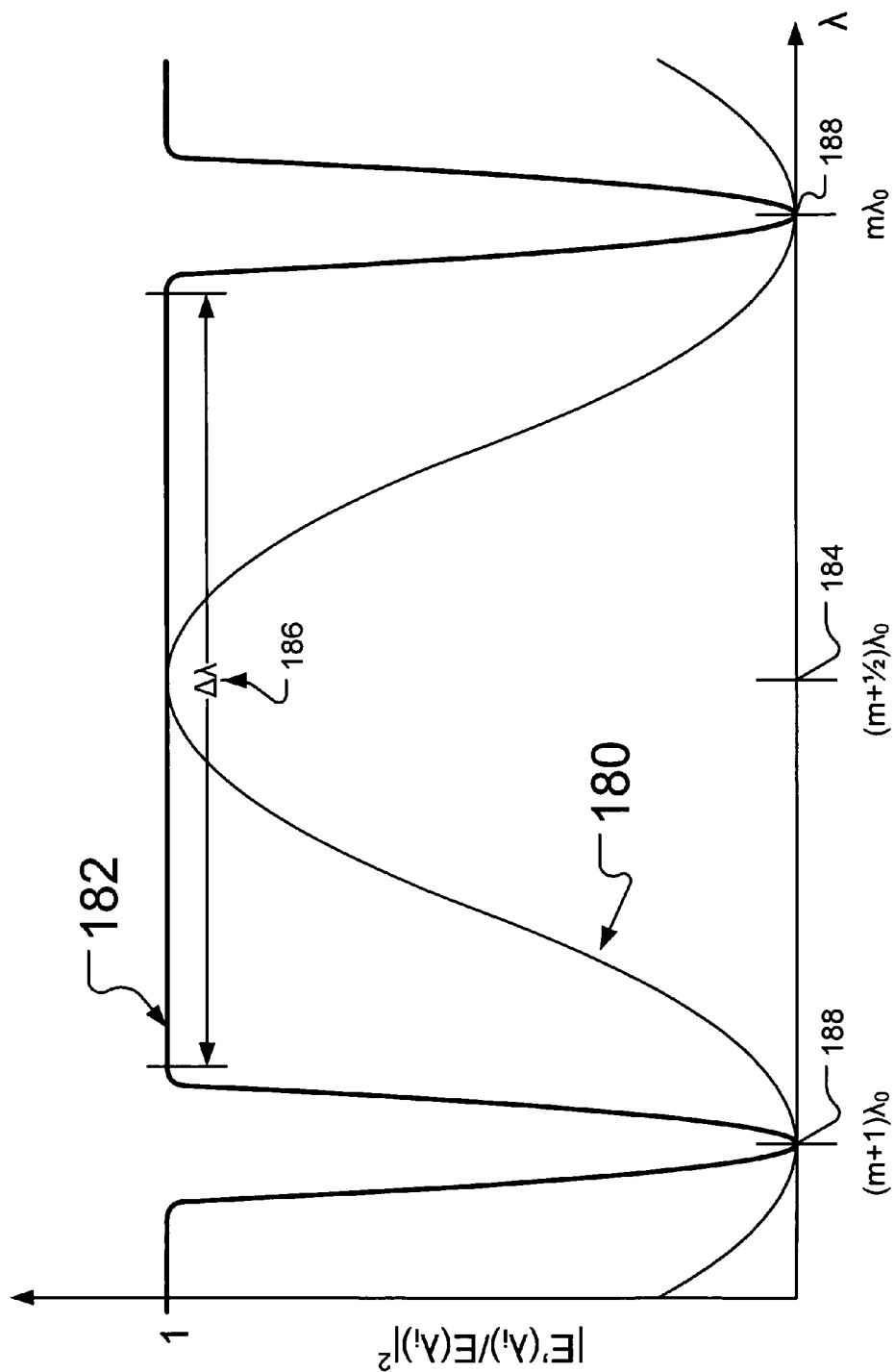

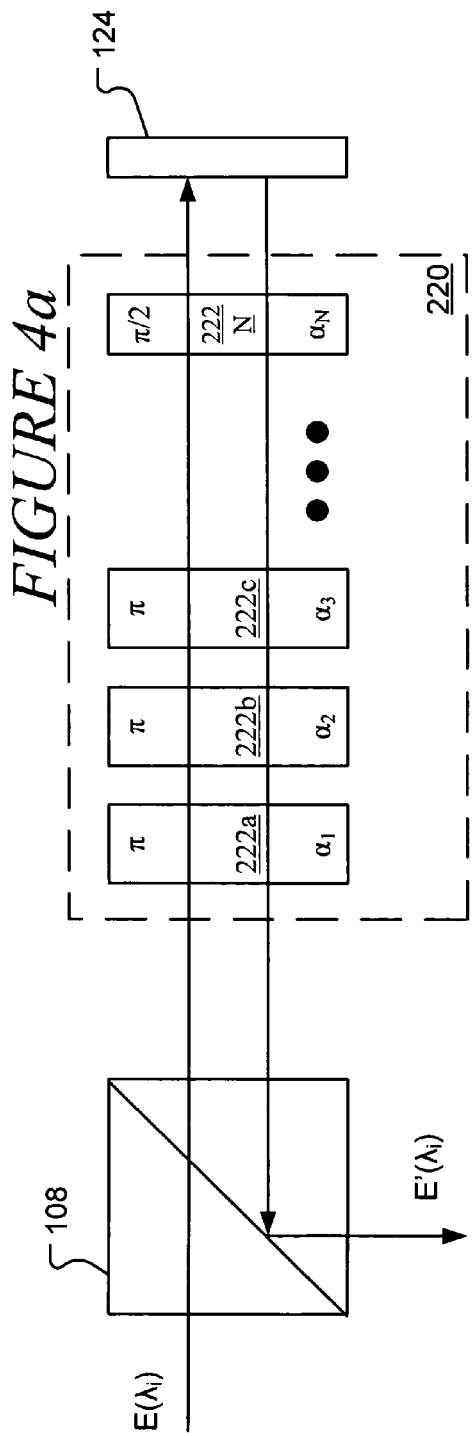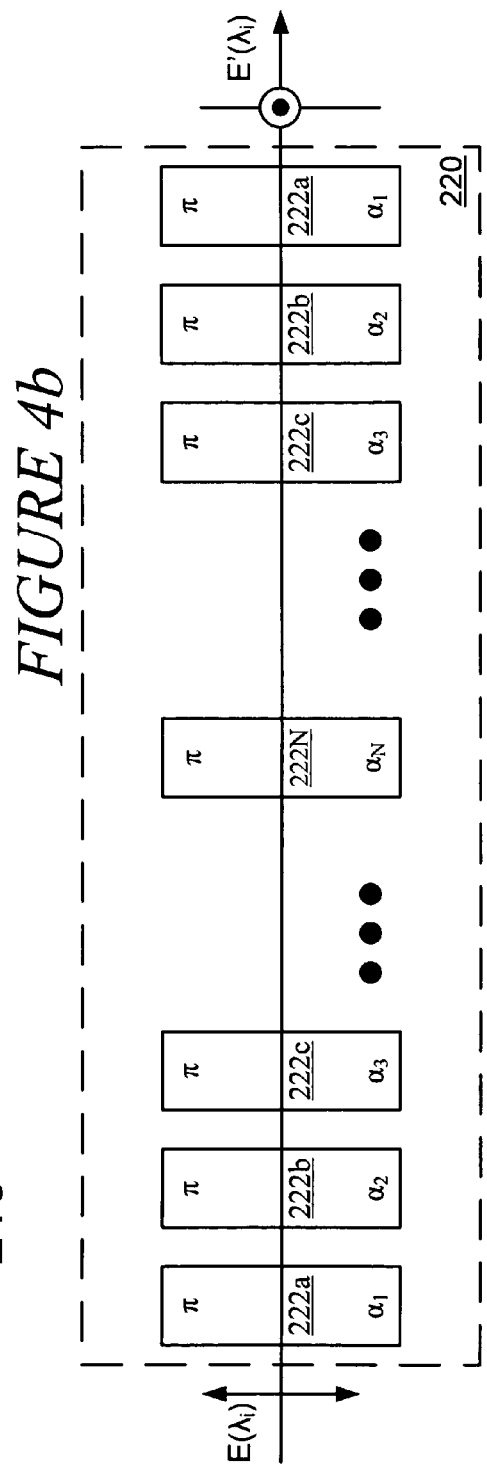

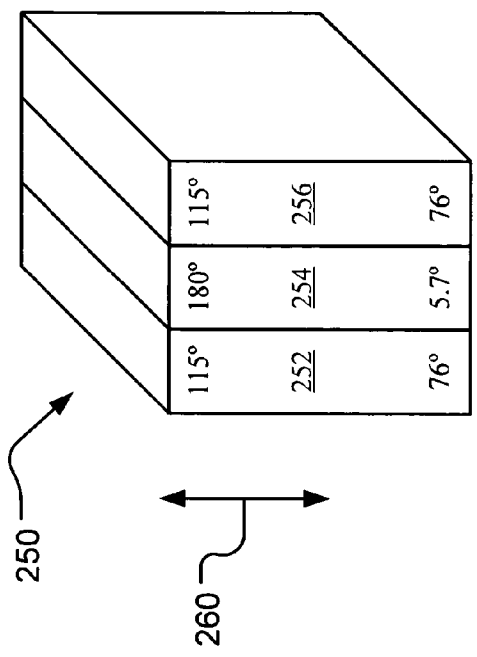
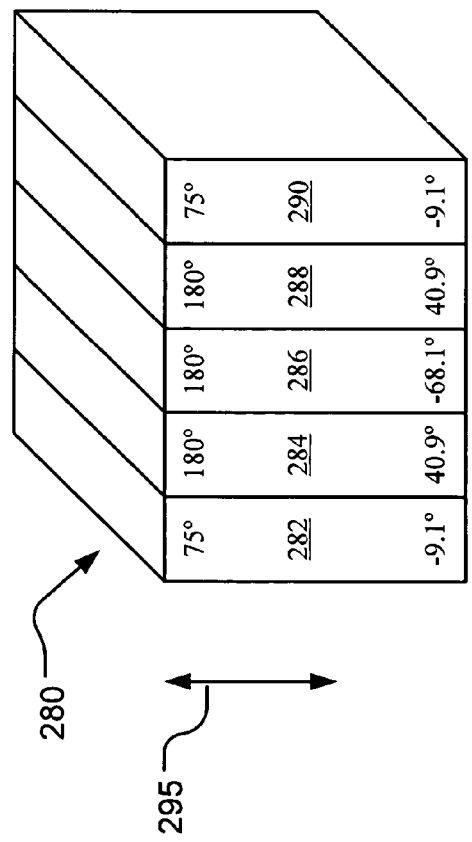

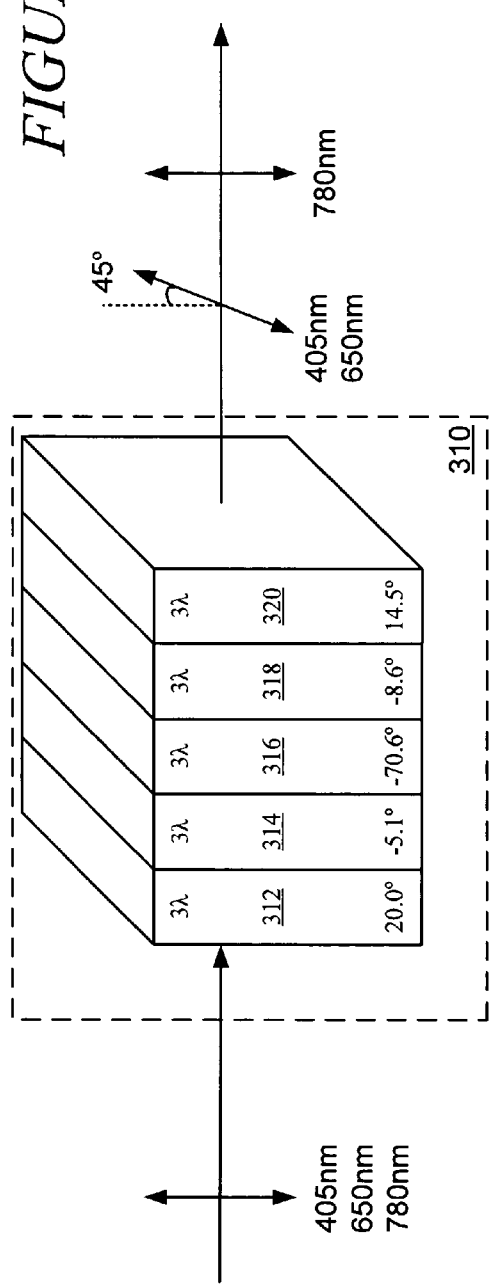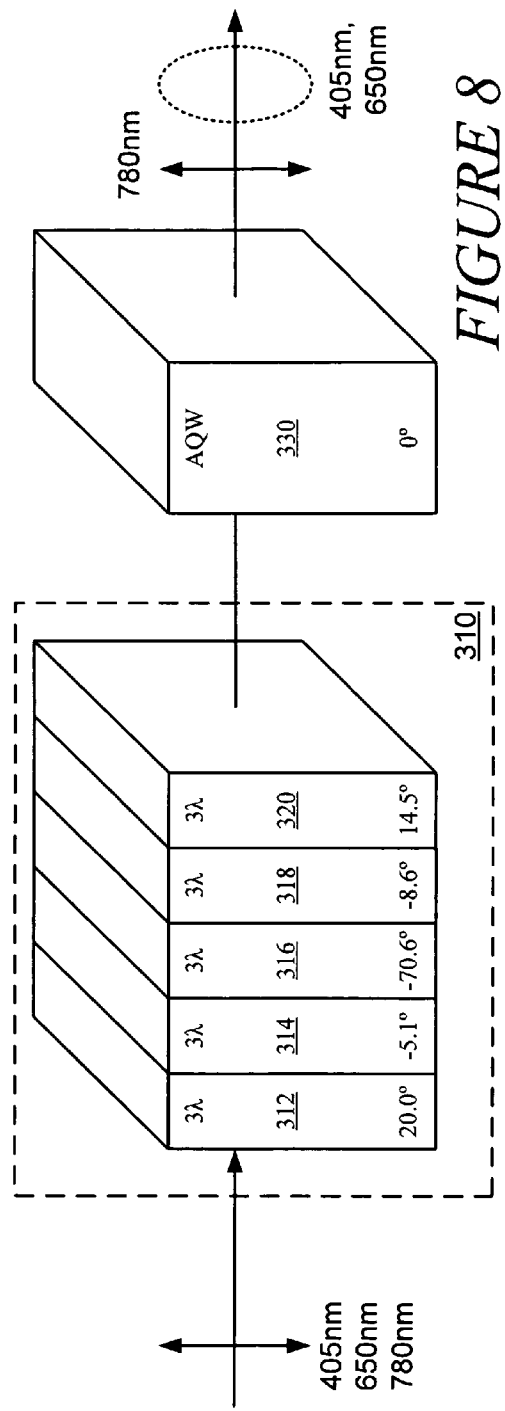

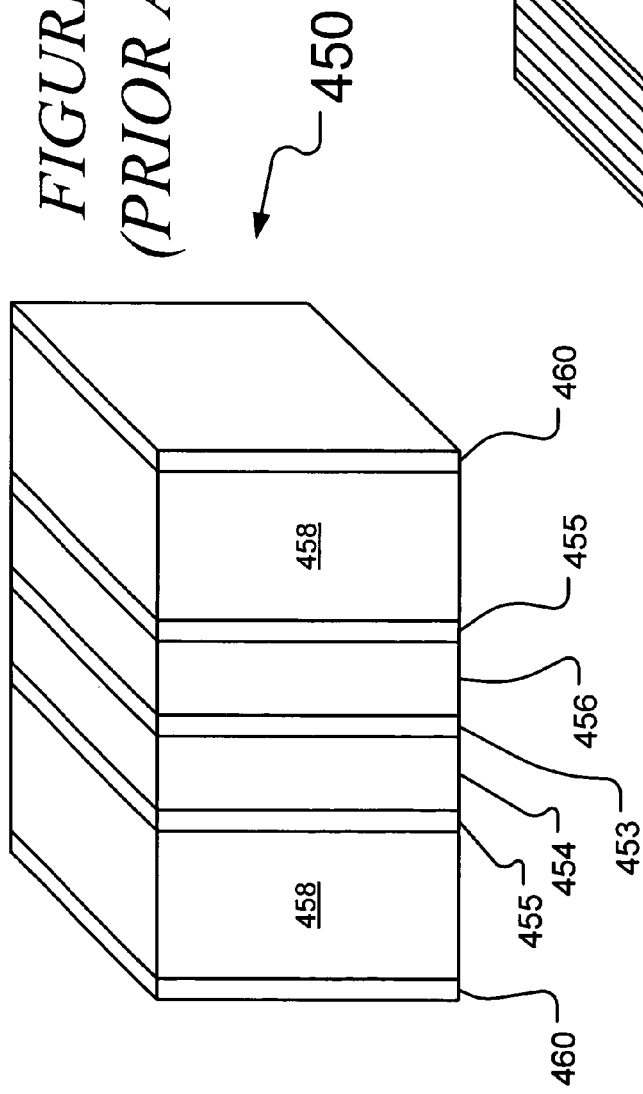
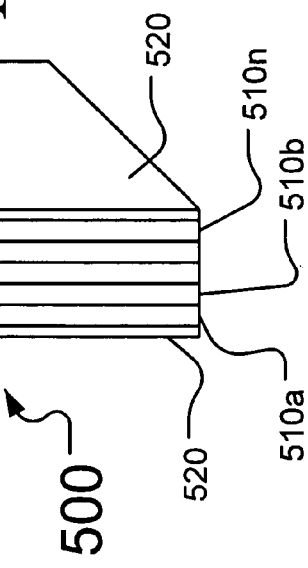

ACHROMATIC POLARIZATION DEVICES FOR OPTICAL DISC PICKUP HEADS

CROSS-REFERENCE TO RELATED APPLICATIONS

This Application claims priority to Provisional Patent Application No. 60/593,172, filed Dec. 16, 2004. Incorporation by reference of the entire disclosure of that provisional application is considered as being part of the disclosure of the accompanying application and is hereby incorporated by reference herein.

BACKGROUND OF THE INVENTION (1) Field of the Invention

The present disclosure relates to polarization control elements for use in optical disc pickup heads. More specifically, the present disclosure provides multilayer laminates exhibiting wavelength stable retardation for two or more wavelengths.

(2) Description of the Related Art

Optical pickup heads are used both to read and to record information on an optical disc. Generally, this information includes file, audio, and video information. Different laser wavelengths are used, depending on the format. For 650 megabyte (Mb) CD, a 785 nm wavelength is used, for a 4.78 gigabyte (Gb) DVD-ROM, a 650 nm wavelength is used, and for a DVD-R, a 650 nm wavelength read wavelength is used with a 630 nm write wavelength. The proposed next generation DVD media, for example Blu-ray and HD-DVD, use a laser operating at a wavelength of 405 nm. There are several types of optical disc drives in mass production: CD-R (or compact disc recordable), CD-RW (or compact disc rewritable), DVD±R and DVD±RW, which are respectively recordable and rewritable optical discs, as well as next-generation 405 nm drives.

Given that there are so many optical disc formats in existence, the market demands interoperability of several formats in a single disc drive. Accommodation of these several formats, however, often requires numerous sets of optical components of different types configured together. For example, U.S. Pat. No. 6,240,053 to Akiyama shows a conventional pickup head design in which an optical isolator arrangement is used. Light from each laser passes through a polarizing beam splitter and is incident as a linear-polarized incident light on a quarter-wave plate (QWP), which provides circular polarization. Return light from the optical disc, makes a second pass of the QWP, and is thus converted to the orthogonal linear state of polarization relative to the state of polarization of the incident light. This light exits a separate port of the polarizing beam splitter, the light being directed toward a photodetector. As noted by Akiyama, when light of two wavelengths shares the QWP, it is necessary for the QWP component to generate circular polarization at both wavelengths.

Multi-layer retarder stacks that produce a two-or-more wavelength stable responses are well known in the art. In 1948, Destriau and Prouteau combined a quarter-wave and half-wave retarder, with a 60° angle between their optic axes, to produce a circular polarization from linear polarization. In 1955, Pancharatnam combined two half-wave retarders with a quarter-wave retarder to produce an achromatic circular polarizer with a broader spectral range. In the Pancharatnam design, input linear polarized light passed through half-wave retarders at angles of 6.9° and 34.5°, respectively, followed by a quarter-wave retarder at an angle of −79.7°. Mindful that circular polarizers do not behave precisely as quarter-wave plates (i.e., no optic axis), Pancharatnam also generated the design for a three-layer quarter-wave retarder. McIntyre and Harris (1968) disclosed designs for achromatic visible waveplates using a network synthesis technique. Koester (1958) showed that multiple half-wave retarders could be combined to produce broad-band linear polarization rotators. General properties of two-pass retarder networks were also discussed by Ammann in 1966.

Such multilayer retarder stacks have conventionally been manufactured using multiple components with different thermal, optical and structural properties bonded together with an optical adhesive. An example is provided with reference to FIG. 9. As described below, such multilayer retarder stacks are complex to manufacture and are susceptible to deviations in performance caused by temperature variations.

Complexity of known optical pickup head designs leads to increased manufacturing costs and reduced reliability because there is a greater probability of failure as system complexity increases. It is thus desirable to produce optical pickup heads with less expense, and without significantly increasing component count, that can accommodate two or more wavelengths, providing increased compatibility among the various optical disc formats. In configurations using a common path for each laser (or lasers emitting multiple wavelengths), functional requirements of components are thus expanded to cope with certain chromatic effects.

BRIEF SUMMARY OF THE INVENTION

Disclosed are multilayer chemically-bonded polymer laminates that assign specific polarization states to two or more laser wavelengths in an optical pickup head. These polymer laminates include retarder films that are oriented at specific angles, so that the net polarization transformation is specific to the incident wavelength. Under certain circumstances, this polarization state is uniform for all wavelengths (e.g., circular). In other cases, the polarization can be unchanged at one wavelength, but is partially transformed (e.g. circular or 45° linear) at another wavelength.

The multilayer polymer laminates are assembled using chemical bonding techniques, such that the finished structure is of high optical quality, is mechanically stable, and is highly durable, while low in cost. These polymer multilayer laminates can provide wavelength-specific polarization control laminates that are symmetric in construction. Such structures may be constructed to have no specified input and output side, thereby simplifying the optical head assembly process. The multilayer polymer laminates further comprise robust polarization performance in a variety of environmental conditions. Such laminates can comprise layers of a single material, and as such, issues related to differential thermal expansion can be mitigated or eliminated compared to polymer retarder materials bonded between glass using optical adhesives, which would suffer from mismatch in thermal expansion. The latter construction can cause stresses that affect the optic axis and retardation stability.

Further disclosed are laminate structures that are mechanically stable in a free-standing mode. Optically, polymer stacks assembled with chemical bonding can be polished and directly coated with an antireflection coating to yield parts that are virtually free of internal and external reflections. At sufficient thickness, such laminates may be rigid and flat enough that they can be used in a free-standing mode.

Also described are multilayer retarder structures having three or more layers that produce wavelength-controlled polarization over extremely extended wavelength ranges, including two or more, or all, of the wavelengths 405 nm, 630 nm, 650 nm and 785 nm.

BRIEF DESCRIPTION OF THE SEVERAL VIEWS OF THE DRAWINGS

FIG. 2a illustrates a diagram of a reflection-mode isolator including an achromatic quarter-wave retarder stack in accordance with the present disclosure;

FIG. 2b illustrates a diagram of an equivalent unfolded arrangement of the retarder stack, as illustrated in FIG. 2a;

FIG. 3 is a graph showing the normalized relationship of the transmission properties of (i) a single layer quarter-wave retarder plate and (ii) a multilayer quarter-wave retarder as a function of incident wavelength in accordance with the present disclosure;

FIG. 4a illustrates a diagram of a reflection-mode isolator including an achromatic half-wave retarder stack in accordance with the present disclosure;

FIG. 4b illustrates a diagram of an equivalent unfolded arrangement of the retarder stack as illustrated in FIG. 4a;

FIG. 5 illustrates a diagram of a three-layer achromatic quarter-wave retarder stack in accordance with the present disclosure;

FIG. 6 illustrates a diagram of a five-layer achromatic quarter-wave retarder stack in accordance with the present disclosure;

FIG. 7 illustrates a diagram of an exemplary embodiment of a retarder stack that converts a linear state of polarization, wavelength selectively, to a rotated state in accordance with the present disclosure;

FIG. 8 illustrates a diagram of an exemplary embodiment including a pair of retarder stacks, that transform a linear state of polarization, wavelength selectively, to a circular state in accordance with the present disclosure;

FIG. 9 illustrates a diagram of a conventional polarization optic utilizing a two-layer liquid crystal polymer;

FIG. 10 illustrates a diagram of a multilayer polymer free-standing polarization optic in accordance with the present disclosure.

DETAILED DESCRIPTION OF THE INVENTION

Figure 1:
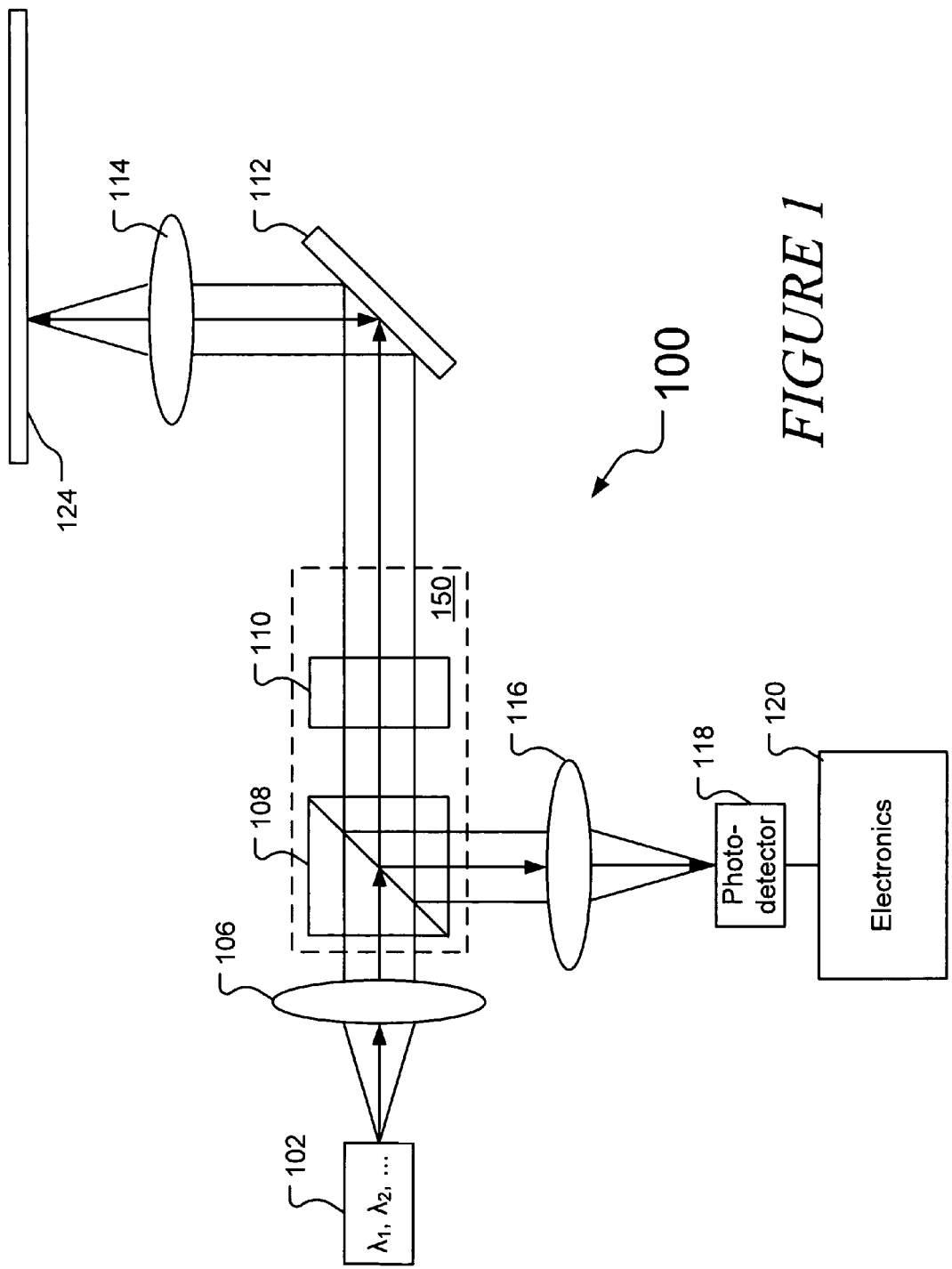
FIG. 1 illustrates a diagram of an optical disc pickup head in accordance with the present disclosure.

FIG. 1 shows an embodiment of an optical disc subsystem 100 having a pickup head 150 accommodating a plurality of wavelengths (e.g., $\lambda_1$, $\lambda_2$, etc.) along a common path. The pickup head 150 may include a light source 102, a first lens 106, a polarizing beam splitter (PBS) 108, a polarization optic 110, a reflective element 112, a second lens 114, a third lens 116, and a photodetector 118 operably coupled to electronic circuitry 120, arranged as shown, although not all of these elements are required to be included in a pick-up head constructed in accordance with the principles of this disclosure. In particular, the pick-up head may or may not include a light source 102 or other components described.

Light source 102 may generate multiple wavelengths of light, e.g., 405 nm, 630 nm, 650 nm, and/or 785 nm. In generating these multiple wavelengths, light source 102 may include a single laser capable of emitting multiple wavelengths, or may include multiple lasers combined using conventional means, or both. Additionally or alternatively, light source 102 may employ light emitting diode (LED) structures to produce the wavelengths of light, with LED structures being a known alternative to lasers for such purposes. Polarization optic 110 may, for example, be a circular polarizer. Reflective element 112 may be a mirror, a total internal reflection prism, or any other optical device providing a reflective boundary.

In operation, light of two or more wavelengths from light source 102 is combined by the first lens 106 to form a collimated incident light beam along a common path. As mentioned above, this incident light may originate from a single source or multiple sources. Collimated light from the first lens 106 passes (on a forward pass) through the PBS 108, where it emerges linearly polarized. With the light continuing on the forward pass, a polarization optic 110 circularly polarizes the incident light. The light is then deflected to a second lens 114 by a reflective element (e.g., a mirror or total internal reflection prism) 112, where it is focused onto an optical disc (e.g., CD/DVD) 124.

Upon reflecting from the surface of the optical disc 124, the return or reflected read-light retraces the path. The second lens 114 re-collimates the light, and after being deflected by the reflective element 112, the return beam makes a reverse pass of the polarization optic 110. Upon the reverse pass, the refelcted light is preferably polarized substantially orthogonal to the counter-propagating input beam of the forward pass, which may also be referred to as the incident light. The read-light is then reflected by the PBS 108, where it is focused by the third lens 116 onto the photodetector 108. The photodetector 118 converts the read-light to an electrical current for processing by electronic circuitry 120.

For efficient transfer of read-light to the photodetector, preferably, the optical isolator arrangement of the PBS 108 and polarization optic 110 provides substantially orthogonal polarization in a round trip at all relevant wavelengths (e.g., 405 nm, 630 nm, 650 nm, and/or 785 nm). For this to occur, the polarization optic 110 preferably should provide substantially uniform behavior at the two or more desired wavelengths used by the light source 102.

Exemplary designs, constructions and properties of the polarization optic 110 will be discussed in detail below with reference to FIGS. 2a to 11. Due to the chromatic limitations of a single layer quarter-wave retarder, a more elaborate solution may be used to provide the desired achromatic polarization state. The described optic 110 thereby provides a polarization mapping that transforms an achromatic linear state of polarization to an achromatic circular state of polarization for the two or more desired wavelengths.

Such a solution for providing a polarization transforming an achromatic linear state of polarization to an achromatic circular state of polarization may be provided using some arrangement of anisotropic inhomogeneity along the direction of propagation. As used here, anisotropic inhomogeneity refers to the concept that each layer has an independent anisotropy, such that as the light beam passes through the layers of a multi-layer retarder stack, the propagating light can encounter many different (and unrelated to each other) optical axes. The optical axes of the layers can be chosen to satisfy the design conditions. As in the present disclosure, the inhomogeneity may be an engineered solution, such as a stack of two or more laminated linear retarders. The inhomogeneity may alternatively be a single liquid crystal polymer layer, which self-assembles into a graded inhomogeneous structure (such as a director twist with pitch large relative to the incident wavelength). It may furthermore be a hybrid stacked liquid crystal polymer. Regardless of the technique for providing the solution, the solution provides a unitary transformation that entails a lossless polarization mapping of a linear to a circular state of polarization.

FIG. 2a illustrates a diagram of a reflection-mode isolator including an achromatic quarter-wave retarder stack in accordance with the present disclosure. In this exemplary embodiment, a reflection-mode isolator arrangement 150 includes PBS 108 and polarization optic 110. In operation, laser light with wavelength $\lambda_i$ and amplitude $E(\lambda_i)$ passes through a PBS 108, then through a polarization optic 110 where it encounters a double-pass of the structure. The polarization optic 110 provides an achromatic quarter-wave retarder stack having N elements 152a through 152N, each with retardation $\Gamma_x$ and slow axis orientation $\alpha_x$, where x=1 corresponds to element 152a, and x=N corresponds to element 152N. Subsequently, polarization modified light is analyzed by the PBS 108, with reflected amplitude $E'(\lambda_i)$.

FIG. 2b is the equivalent unfolded arrangement of the retarder stack of polarization optic 110, which is convenient for illustrative purposes. It shows that a structure containing an odd number (i.e. 2N−1) of elements is effectively encountered in a round trip of a forward and reverse pass. Second, it shows that the effective stack includes a pair of retarders with a symmetric arrangement; retarders on the output stack have the equivalent angles to those of the input stack, but are presented in reverse order. Moreover, it shows that the thickness of the central element in the unfolded arrangement is effectively doubled.

The effect of the polarization optic 110 is conveniently described using Jones Calculus, which propagates the state of polarization through anisotropic materials. The unitary transformation of a lossless linear retarder can be expressed in the general form:

$$S^+ = \begin{pmatrix} a & b \\ -b^* & a^* \end{pmatrix}$$

where, $$aa^* + bb^* = 1$$

And the common-phase, which has no impact on the state of polarization, has been omitted. It can furthermore be shown that any stack of retarders 152a-152N (or LC polymers), with arbitrary retardation and optic axis orientation, can be written in this form, taking $S^+$ to represent the forward pass of such a polarization optic.

By suitable multiplication of Jones matrices, it can be shown that the reverse pass matrix is always of the form:

$$S^- = \begin{pmatrix} a & -b^* \\ b & a^* \end{pmatrix}$$

Thus, the double-pass matrix is given as the product of the forward and reverse pass matrices:

$$M = S^- S^+ = \begin{pmatrix} a & -b^* \\ b & a^* \end{pmatrix}\begin{pmatrix} a & b \\ -b^* & a^* \end{pmatrix}$$

which equals:

$$\begin{pmatrix} a^2 + b^{*2} & ab - a^*b^* \\ ab - a^*b^* & a^{*2} + b^2 \end{pmatrix}$$

This gives the important general result that the off-diagonal components are identical in amplitude, which precludes polarization rotation.

Moreover, using, $$a = |a|e^{-i\alpha}$$

and $$b = |b|e^{-i\beta}$$

gives $$(ab - a^*b^*) = -i2|a||b|\sin(\alpha + \beta)$$

showing that the off-diagonal amplitude is in general imaginary.

If a double-pass arrangement in accordance with the present disclosure is used to convert linear polarized incident light to the orthogonal state of polarization for the reflected light, the diagonal components must vanish, forcing the constraint, $$|a| = |b| = 1/\sqrt{2}$$

$$(\alpha + \beta) = \pi(\tfrac{1}{2} + m)$$

where m is an integer. Using the above, the double pass matrix reduces to the form, $$S = \begin{pmatrix} 0 & -i \\ -i & 0 \end{pmatrix}$$

which represents a pure polarization reflection about an axis at $\pi/4$.

Physically, the above matrix represents the transformation of an ideal half-wave retarder, with fast axis oriented along $\pi/4$. This proves an important point about the double-pass of any unitary structure: If the double-pass converts a linear polarization state to its orthogonal linear polarization state, then it behaves as a half-wave retarder at $\pi/4$. This means that the double-pass structure has an optic axis at 45° and has zero polarization rotation for all wavelengths satisfying this conversion.

Inserting the above constraint into the forward-pass matrix gives the result:

$$S^+ = \frac{1}{\sqrt{2}}\begin{pmatrix} e^{-i\alpha} & -ie^{i\alpha} \\ -ie^{-i\alpha} & e^{i\alpha} \end{pmatrix} = \frac{1}{\sqrt{2}}\begin{pmatrix} 1 & -i \\ -i & 1 \end{pmatrix}\begin{pmatrix} e^{-i\alpha} & 0 \\ 0 & e^{i\alpha} \end{pmatrix}$$

where we have used the specific case (m=0). The latter decomposition represents a linear retarder with arbitrary retardation $2\alpha$, oriented parallel to the input polarization, followed by a pure quarter-wave retarder with orientation $\pi/4$. The above matrix illustrates a second point: A circular state exists after the forward pass of the retarder stack to achieve full polarization conversion in double-pass.

Accordingly, from a design standpoint, an effective double-pass converter can be provided by constraining the single pass to produce a very precise circular state. Note that the above is not the matrix of an ideal quarter-wave retarder, which would further require linear eigen-polarizations, but is more appropriately termed a circular polarizer. A pure quarter-wave retarder is thus a further constrained subset of the circular polarizer family, where $\alpha = 0$.

There are often multiple solutions for retarder stack-based circular polarizers that provide identical or substantially similar polarization performance. For example, each design may have the same set and order of retardances but with different sets of retarder orientations. Also, each design may have a unique "compound retardation" Γ, which is hidden in practice by the fixed uniform linear input. This compound retardation often becomes problematic when the input polarization of the light into the optical system does not conform to the intended or designed-for polarization input.

The reverse-pass stack can be written as a quarter-wave retarder with orientation $\pi/4$, followed by a linear retarder with retardation $2\alpha$ and orientation also parallel to the input. In double-pass, the net half-wave central retardation reflects the state of polarization, such that external retardation is substantially nullified. Since a stack possessing the above symmetry converts at least two wavelengths to the orthogonal linear state, it can be regarded as a half-wave retarder for those at least two wavelengths. In addition to having stable retardation, the structure can furthermore be considered to have wavelength stable eigenpolarizations for those at least two wavelengths. Accordingly, the round-trip matrix can be diagonalized via a $\pi/4$ rotation. A compound element with stable behavior over an extended band is called an achromatic half-wave retarder. Based on the above, an achromatic half-wave retarder can be designed by pairing an achromatic circular polarizer with the reverse order stack.

Based on the above discussion, a multi-layer polarization optic may be provided using either of two approaches. The first approach is performed by providing a stack that produces a precise circular state at all relevant wavelengths. The second approach is to provide an achromatic half-wave retarder with reverse-order symmetry, and divide the stack in half.

FIG. 3 is a graph showing the normalized relationship of the transmission properties of (i) a single layer quarter-wave retarder plate and (ii) a multilayer quarter-wave retarder as a function of incident wavelength in accordance with the present disclosure.

A single layer quarter-wave retarder plate (with the exception of some dispersion controlled copolymers), may provide appropriate retardation at a single wavelength. Graph 180 shows the double-pass crossed-polarizer transmission of a single-layer retarder, which gives unity transmission only at the half-wave wavelength 184.

Graph 182 shows that a multilayer quarter-wave retarder stack can expand the half-wave retardance range to encompass a bandwidth $\Delta\lambda$ 186. If the unfolded stack is comprised of uniform thickness waveplates, a spectrum similar to graph 182 is typical. That is, a substantially flat response (centered on the half-wave wavelength 184) can exist between minima corresponding to a full-wave retardance. At the full-wavelengths 188, it is possible to have no polarization manipulation, making this an exercise in narrowing the notches centered on the full-wave wavelengths 188. The broadest coverage occurs when using zero-order half-wave retarders (m=0), where there is no actual minimum at wavelengths longer than the half-wave wavelength 184.

As discussed above, a circular polarizer may be designed by providing an achromatic half-wave retarder with reverse-order symmetry and dividing the stack in half. For such a circular polarizer design, a large solution set can exist including N retarders with arbitrary orientation and retardation. However, it is generally most convenient to minimize the number of unique retardance values (e.g., all films are laminated using the same base retardance). Moreover, since solutions using half-wave retarders are symmetric about the half-wave wavelength, the broadest half-wave bandwidth ($\Delta\lambda$186) occurs when the zero-order (m=0) half-wave wavelength is roughly centered in that band.

FIG. 4a illustrates a diagram of a reflection-mode isolator including an achromatic half-wave retarder stack in accordance with the present disclosure. The reflection-mode isolator 210 includes PBS 108 and an achromatic half-wave retarder 220. Retarder 220 includes retarder elements 222a to 222N. FIG. 4b illustrates a diagram of an equivalent unfolded arrangement of the retarder stack as illustrated in FIG. 4a.

Achromatic half-wave retarder 220 is a circular polarizer having an odd-number of zero-order half-wave layers in reverse-order configuration, and thus has a broad spectral coverage with a minimal number of layers. While compound retardation can exist along the input direction, it is nullified in double-pass. Therefore, the orientation tolerance is no greater or less than that of a zero-order quarter-wave retarder. There is, however, a specific input side in this architecture. In order to ensure that light enters the half-wave side, it is frequently necessary to cut unsymmetrical shapes, such as trapezoids. This is an inconvenience and reduces the packing density of parts on the mother sheet.

Given that any design is likely to encompass the half-wave wavelength, it is beneficial to consider any constraints imposed at that wavelength. It is straightforward to show that the Jones matrix for a series of half-wave retarders with arbitrary orientations may be expressed as a pure rotator, whereas an odd number of half-wave retarders may be expressed as a polarization reflector (or half-wave plate). Thus, a solution based on half-wave retarder films will use an odd number of layers. As FIG. 4a shows, this is a convenience, since only an odd-number solution is possible. Note that the uniform retardance requirement forces the retarder 222N directly adjacent the optical disc 124 to be half the thickness of the other elements (nominally quarter-wave). As the number of half-wave layers 222a to 222(N−1) is added, the potential for broader bandwidth achromatic half-wave retarders exists, using a suitable set of angles. For example, angles for circular polarizers include the (15°/75°) design of Destraiu and Proteau, and the (6.9°/34.5°/−79.7°) design of Pancharatnam.

A different solution set can result when a retarder stack is required to behave as a pure retarder in single-pass. Achromatic quarter-wave retarders are symmetric, at least in behavior, permitting part flipping with no functional change. Achromatic multilayer waveplate designs exist that, like the above circular polarizer designs, also use only two retardance values in their construction. While there are many such solutions, one solution set comprises stacks possessing the reverse order symmetry shown in the unfolded double-pass arrangement of FIG. 2b. In this arrangement, the external retarders, have a unique retardance value, sandwiching an odd number of half-wave retarders. Such designs are again symmetric about the half-wave wavelength. However, the additional requirement for a compound optic axis ($\alpha=0$), tends to diminish the spectral coverage of uniform retardation ($\Delta\lambda$). For instance, an optimized three-layer AQW has the spectral coverage of a two-layer ACP. However, the cost associated with the additional lamination to achieve comparable performance is relatively low. In addition, as discussed with reference to FIG. 10, a free-standing monolithic element will use additional layers regardless, because mechanical stability and established thickness standards force a certain number of laminations. A typical film thickness of a retarder is approximately 65 microns, so several layers are needed to meet the thickness standards. Often, these are "dummy" layers, which increase thickness, with no impact on the state of polarization.

FIG. 5 illustrates a diagram of a three-layer achromatic quarter-wave retarder stack in accordance with the present disclosure. This exemplary achromatic quarter-wave retarder stack 250 includes three retarder plates: 252, 254, and 256, having retardance values of 115°, 180°, and 115°; and optic axis values of 76°, 5.7°, and 76° respectively. This three-layer achromatic quarter-wave retarder stack 250 performs a linear-to-circular transformation when the optic axis of the input light is at 45 degrees relative to the illustrated reference orientation 260.

FIG. 6 illustrates a diagram of a five-layer achromatic quarter-wave retarder stack in accordance with the present disclosure. The exemplary achromatic quarter-wave plate retarder stack 280 includes five retarder plates: 282, 284, 286, 288 and 290, having retardance values of 75°, 180°, 180°, 180°, and 75°; and optic axis values of −9.1°, 40.9°, −68.1°, 40.9°, and −9.1° respectively. This five-layer achromatic quarter-wave retarder stack performs a linear-to-circular transformation when the optic axis of the input light is at 45 degrees relative to the illustrated reference orientation 295.

Under certain circumstances, it is beneficial to assign distinct polarization states to each laser wavelength. For instance, the needs of write light and read light are different, requiring distinct polarization states. Thus, FIG. 7 illustrates a diagram of an exemplary embodiment of a retarder stack that converts a linear state of polarization, wavelength selectively, to a rotated state in accordance with the present disclosure.

A use of the disclosed technology is to provide uniform polarization over a range of wavelengths (e.g. circular or 45-degree linear), while assigning a different polarization state to another range of wavelengths. Such stack designs can be designed directly, or can be assembled from separate structures with distinct polarization functionality.

Retarder stacks can be designed which provide, for example, a 45-degree rotation to linear polarization. FIG. 7 shows one such example, where polarization optic 310, with a base retardation of three waves, is used to manipulate 405 nm and 650 nm light, while leaving 785 nm light unchanged. In order to achieve this, retarder layers 312/314/316/318/320 have optic axis orientations of α=20.0°/−5.1°/−70.6°/−8.6°/14.5° respectively. It should be noted that other solutions may exist to provide a similar result, and that these values are provided by way of example.

FIG. 8 illustrates a diagram of an exemplary embodiment including a pair of retarder stacks, that transform a linear state of polarization, wavelength selectively, to a circular state in accordance with the present disclosure. Here, an achromatic quarter-wave retarder stack 330, which possesses linear eigenpolarizations (α=0°), can be combined with the polarization optic 310 of FIG. 7 to yield a circular state of polarization in predetermined spectral bands (e.g., 405 nm and 650 nm), with no change in the polarization state in another spectral band (e.g., 780 nm).

FIG. 9 illustrates a diagram of a conventional polarization optic utilizing a two-layer liquid crystal polymer retarder. Conventional polarization optic 450 comprises liquid crystal polymer retarder layers 452 and 454, bonded together by optical adhesive 453. Glass plates 458 are bonded to the delicate liquid crystal polymer retarder layers 452 and 454 with optical adhesive 455 to provide structural support. The external faces of the glass plates are coated with an antireflection layer 460.

When dissimilar materials are used in polarization optic assemblies, as shown in FIG. 9, there is some risk that the manufacturing processes and thermal variations will produce undesirable stress birefringence. Thermal variations may include uniform and nonuniform effects, the latter tending to induce more stress birefringence. Polymer films 452 and 454 typically expand at a rate roughly ten times that of glass 458, while optical adhesives 453 and 455 usually have yet a higher rate of expansion. The strain on the actual retarder film(s) from this can induce a spatial variation in the optic axis (e.g. optic axis rotation in the corners), and retardance (e.g., retardation shift at the center of each edge). Moreover, strain associated with differential thermal expansion can produce changes in the spatial uniformity of the optical properties of the component. This can result in temperature dependence in the transmitted wavefront distortion.

FIG. 10 illustrates a diagram of a multilayer polymer free-standing polarization optic in accordance with the present disclosure. In an embodiment, a polarization optic 500 has a monolithic structure including a stack of polymer retarder films 510*a* through 510*n*, which are laminated together using a chemical bonding process (where a=1 and n is the number of polymer retarder layers). Such laminates are comprised of a single material, and as such, issues related to differential thermal expansion are less relevant. In contrast, polymer retarder materials bonded between glass using optical adhesives (as shown in FIG. 9) suffer from mismatch in thermal expansion. This can cause stresses that affect the optic axis and retardation stability. Other layers, such as dummy layers, antireflection coatings, etc., may be provided as external faces 520 for structural stability, durability, and desired optical properties.

Figure 11:
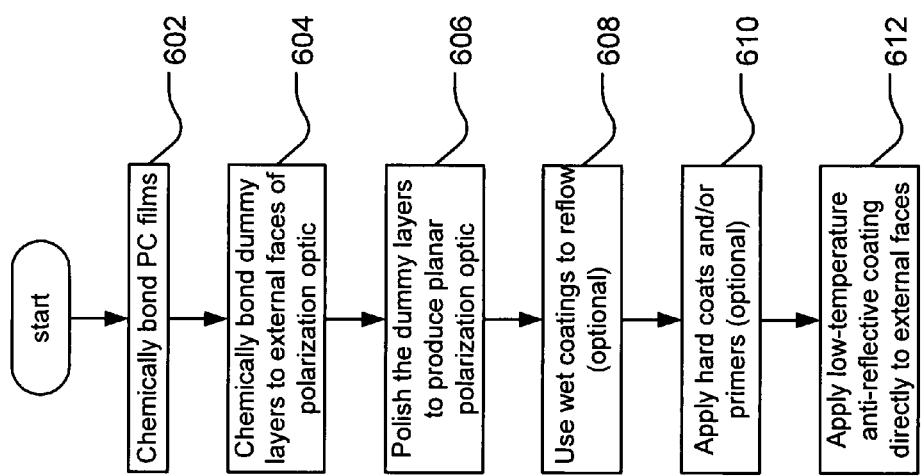
FIG. 11 illustrates a logical flow diagram illustrating a method for manufacturing the multilayer polymer free-standing polarization optic in accordance with the present disclosure.

FIG. 11 illustrates a logical flow diagram illustrating a method for manufacturing the multilayer polymer free-standing polarization optic in accordance with the present disclosure. In this process, polymer retarder films can be chemically bonded together at step 602. Exemplary processes and materials are as described in commonly-owned U.S. Pat. No. 6,638,583, which is herein incorporated by reference. Because the individual retarder films may not be optically flat, the resulting stack can show unacceptable transmitted wavefront characteristics. This problem can be overcome using some form of planarization. One planarization technique involves chemical bonding of additional dummy layers (often with zero in-plane retardation) on the external faces of the polarization optic at step 604. A double-side polishing technique may then be used to produce a planar polarization optic at step 606. Optionally, the finished element may be further planarized using wet coatings that reflow, or planarize directly, at step 608. Another optional step is to deposit other optically thin layers, such as hard coats and primers, at step 610. At step 612, a low-temperature antireflection coating may be directly applied to the external faces to yield parts that are relatively free of internal and external reflections. The result is a polarization optic with no significant internal stress, and relative insensitivity to the thermal issues that plague designs based on stacks of dissimilar materials.

It will be appreciated by those of ordinary skill in the art that the invention can be embodied in other specific forms without departing from the spirit or essential character thereof. Any disclosed embodiment may be combined with one or several of the other embodiments shown and/or described. This is also possible for one or more features of the embodiments. The steps herein described and claimed do not need to be executed in the given order. The steps can be carried out, at least to a certain extent, in any other order.

Further, it will be appreciated by one of ordinary skill in the art that various retardance and optic axis values for numerous retarder designs may be combined to perform other desired transformations and for various other wavelengths. As used herein, the term achromatic plates, achromatic polarization device, or achromatic polarization rotators refer to devices that are operable to provide a consistent polarization rotation at two or more wavelengths. It will also be appreciated that the compound retarder stack disclosed herein may be combined with various other optical components to perform similar results. The presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein.

Additionally, the section headings herein are provided for consistency with the suggestions under 37 C.F.R. §1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background of the Invention" is not to be construed as an admission that technology is prior art to any invention(s) in this disclosure. Neither is the "Brief Summary of the Invention" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. An achromatic polarization device for an optical disc pickup head, the achromatic polarization device comprising:
   a monolithic retarder stack comprising:
      a first polymer retarder layer and
      a second polymer retarder layer chemically bonded to the first retarder polymer layer, whereby the first and second retarder polymer layers are connected by a direct chemical bond formed therebetween;
   wherein the first and second polymer retarder layers are made of the same material;
   wherein the monolithic retarder stack is operable to transform, on a forward pass, linearly polarized light to circularly polarized light, and on a reverse pass, circularly polarized light to linearly polarized light, wherein the light on the reverse pass is substantially orthogonal to the light on the forward pass.

2. The achromatic polarization device according to claim 1, wherein the monolithic retarder stack further comprises a third polymer retarder layer chemically bonded to the second polymer retarder layer.

3. An achromatic polarization device according to claim 2, wherein the first, second and third polymer retarder layers respectively comprise first, second and third angles of retardation that are collectively operable to transform a state of polarization as a function of incident wavelength.

4. The achromatic polarization device according to claim 1 wherein the achromatic polarization device is a compound quarter wave retarder.

5. A compound quarter wave retarder according to claim 4, wherein the predetermined wavelengths are selected from the group consisting of 785 nm, 650 nm, 630 nm and 405 nm.

6. An achromatic polarization device according to claim 1, wherein the monolithic retarder stack assigns specific polarization states to two or more predetermined wavelengths.

7. An achromatic polarization device according to claim 1, wherein the monolithic retarder stack provides a stable optic axis.

8. An achromatic polarization device according to claim 1, wherein the monolithic retarder stack provides retardation stability.

9. An achromatic polarization device according to claim 1, wherein a state of polarization is unchanged at a first wavelength, and wherein the state of polarization is partially transformed at a second wavelength.

10. An achromatic polarization device according to claim 1, wherein the monolithic retarder stack provides wavelength-specific polarization control.

11. An achromatic polarization device according to claim 1, wherein the monolithic retarder stack provides substantially uniform polarization transformation properties at predetermined wavelengths.

12. An achromatic polarization device according to claim 1, wherein the polarization state transformation of the monolithic retarder stack from an input side to an output side is substantially equivalent to the polarization state transformation from the output side to the input side.

13. An achromatic polarization device according to claim 1, wherein the monolithic retarder stack further comprises:
   a fourth polymer retarder layer chemically bonded to the third retarder polymer layer; and
   a fifth polymer retarder layer chemically bonded to the fourth polymer retarder layer.

14. An achromatic polarization device according to claim 13, wherein:
   the first polymer retarder layer has a retardance of 75 degrees,
   the second polymer retarder layer has a retardance of 180 degrees,
   the third polymer retarder layer has a retardance of 180 degrees,
   the fourth polymer retarder layer has a retardance of 180 degrees, and
   the fifth polymer retarder layer has a retardance of 75 degrees.

15. An achromatic polarization device according to claim 1, wherein the first polymer retarder layer has a thickness in the range of 50 to 150 micron.

16. An achromatic polarization device according to claim 1, wherein the monolithic retarder stack further comprises an anti-reflection coating.

17. An achromatic polarization device according to claim 1, wherein the monolithic retarder stack is comprised substantially of a single material.

18. An achromatic polarization device according to claim 1, wherein the monolithic retarder stack has a uniform coefficient of thermal expansion.

19. An achromatic polarization device according to claim 1, wherein the monolithic retarder stack is polished.

20. An optical disc subsystem, optically coupled to a light source operable to generate light of at least two wavelengths, comprising:
   a polarizing beam splitter (PBS) operable to receive the light from the light source and linearly polarize the light on a forward pass, wherein the PBS is further operable to receive linearly polarized light on a reverse pass, wherein the PBS further comprises a boundary operable to reflect at least a portion of the reverse pass light; and
   a polarizing device operable to transform, on the forward pass, linearly polarized light from the PBS to circularly polarized light, the polarizing device being further operable to transform, on the reverse pass, circularly polarized light to linearly polarized light, wherein the light on the reverse pass is substantially orthogonal to the light on the forward pass;
wherein the polarizing device comprises polymer retarder layers that are chemically bonded to form a monolithic retarder stack, whereby the first and second retarder polymer layers are connected by a direct chemical bond formed therebetween; and wherein the polymer retarder layers are made of the same material.

21. An optical disc subsystem according to claim 20, wherein the laminated monolithic structure further comprises:
a third polymer retarder layer chemically bonded to the second polymer retarder layer.

22. An optical disc subsystem according to claim 20, wherein the polarizing device is a circular polarizer.

23. An optical disc subsystem according to claim 22, wherein the polarizing device is a compound quarter wave retarder.

24. An optical disc subsystem according to claim 20, wherein the light source comprises a laser.

25. An optical disc subsystem according to claim 20, wherein the light source comprises a light emitting diode.

26. An optical disc subsystem according to claim 20, wherein the monolithic retarder stack assigns specific polarization states to two or more predetermined wavelengths.

27. An optical disc subsystem according to claim 26, wherein the predetermined wavelengths are selected from the group consisting of 785 nm, 650 nm, 630 nm and 405 nm.

28. An optical disc subsystem comprising:
a polarizing beam splitter operable to receive incident light and to direct the incident light according to its polarization; and
a circular polarizer adjacent to the polarizing beam splitter and operable to transform the polarization of the directed incident light received from the polarizing beam splitter, the circular polarizer comprising a monolithic retarder stack having at least a first polymer retarder layer and a second polymer retarder layer chemically bonded to the first retarder layer, whereby the first and second retarder polymer layers are connected by a direct chemical bond formed therebetween; wherein the first and second retarders layers are made of the same material.

29. The optical disc subsystem according to claim 28, wherein the circular polarizer is operable to transform the polarization of the directed incident light received from the polarizing beam splitter from linear polarization to circular polarization.

30. The optical disc subsystem according to claim 28, wherein the monolithic retarder stack further comprises a third polymer retarder layer chemically bonded to the second retarder layer.

31. An optical disc subsystem according to claim 28, wherein the circular polarizer assigns specific polarization states to two or more predetermined wavelengths.

32. An optical disc subsystem according to claim 31, wherein the predetermined wavelengths are selected from the group consisting of 785 nm, 650 nm, 630 nm and 405 nm.

33. A method of processing data on an optical disc comprising the steps of:
receiving light from a light source having one of at least two predetermined wavelengths over a first path;
transforming the light from the first path to linearly polarized light over a second path;
transforming the linearly polarized light from the second path to circularly polarized light over a third path using a circular polarizer, wherein the circular polarizer comprise a monolithic retarder stack, the monolithic retarder stack having at least a first polymer retarder layer and a second polymer retarder layer chemically bonded to the first retarder layer, whereby the first and second retarder polymer layers are connected by a direct chemical bond formed therebetween; and wherein the first and second polymer retarder layers are made of the same material; and
transforming the circularly polarized light from the third path to linearly polarized light over a fourth path using the chemically-bonded laminated circular polarizer,
wherein the fourth path is in the opposite direction to the third path,
further wherein the linearly polarized light over the fourth path is substantially orthogonal to the linearly polarized light over the second path.

34. The method of claim 33 wherein the predetermined wavelengths are selected from the group consisting of 785 nm, 650 nm, 630 nm and 405 nm.

35. An achromatic polarization device for an optical disc pickup head, the achromatic polarization device comprising:
a monolithic retarder stack comprising:
a first polymer retarder layer having a first retardance and a first optic axis and
a second polymer retarder layer having a second retardance and a second optic axis;
wherein the first and second polymer retarders are made of the same material and chemically bonded whereby the first and second retarder polymer layers are connected by a direct chemical bond formed therebetween, and further wherein the angle between the first and second optic axes is not 0 or 90 degrees;
wherein the retarder stack is operable to transform, on a forward pass, linearly polarized light to circularly polarized light, and on a reverse pass, circularly polarized light to linearly polarized light, wherein the light on the reverse pass is substantially orthogonal to the light on the forward pass.

* * * * *